(12) United States Patent
Takahashi et al.

(10) Patent No.: US 12,126,287 B2
(45) Date of Patent: Oct. 22, 2024

(54) MAGNETIC POLE POSITION DETECTION DEVICE

(71) Applicant: Fanuc Corporation, Yamanashi (JP)

(72) Inventors: Kenji Takahashi, Yamanashi (JP); Tomohisa Tsutsumi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 232 days.

(21) Appl. No.: 17/801,848

(22) PCT Filed: Feb. 22, 2021

(86) PCT No.: PCT/JP2021/006645
§ 371 (c)(1),
(2) Date: Aug. 24, 2022

(87) PCT Pub. No.: WO2021/172275
PCT Pub. Date: Sep. 2, 2021

(65) Prior Publication Data
US 2023/0109908 A1  Apr. 13, 2023

(30) Foreign Application Priority Data

Feb. 26, 2020  (JP) ................. 2020-030955

(51) Int. Cl.
*H02P 6/185* (2016.01)
*H02P 6/18* (2016.01)
*H02P 6/20* (2016.01)
*H02P 21/18* (2016.01)
*H02P 25/026* (2016.01)

(52) U.S. Cl.
CPC ............. *H02P 25/026* (2013.01); *H02P 6/18* (2013.01); *H02P 2203/03* (2013.01); *H02P 2207/05* (2013.01)

(58) Field of Classification Search
CPC .......... H02P 6/185; H02P 25/026; H02P 6/20; H02P 6/18; H02P 21/18; H02P 2203/03; H02P 2207/05
(Continued)

(56) References Cited

U.S. PATENT DOCUMENTS 6,344,089 B1 * 2/2002 Tauchi ................. B66B 1/3492
187/391
6,349,796 B1 * 2/2002 Tauchi ................. B66B 1/3492
388/826
(Continued)

FOREIGN PATENT DOCUMENTS

| JP | 2002044984 A | 2/2002 |
| JP | 2005020918 A | 1/2005 |

(Continued)

OTHER PUBLICATIONS

International Search Report and Written Opinion for International Application No. PCT/JP2021/006645, dated Apr. 13, 2021, 5 pages.

*Primary Examiner* — Gabriel Agared
(74) *Attorney, Agent, or Firm* — Buchanan Ingersoll & Rooney PC

(57) ABSTRACT

Provided is a magnetic pole position detection device with which it is possible to shorten the detection time of the initial magnetic pole position of the rotor of a synchronous motor. A magnetic pole position detection device that detects the magnetic pole position of the rotor of the synchronous motor, the magnetic pole position detection device comprising an excitation command unit that excites the synchronous motor while changing the current phase of the excitation current from a preset initial value, and a torque zero determination unit that determines whether the torque generated by the rotor has reached zero, the excitation command unit: continuously executing an operation for exciting the synchronous motor using, as the current phase of the excitation (Continued)

current, a value obtained with a subtraction process for subtracting, from the initial value, a phase angle corresponding to the cumulative value of the movement amount of the rotor from the starting point of excitation at the initial value of the current phase, during the period after the synchronous rotor was excited at the initial value of the current phase until the torque is determined to have reached zero; and acquiring, as the magnetic pole initial position, the value obtained with the subtraction process when the torque is determined to have reached zero.

5 Claims, 15 Drawing Sheets

(58) Field of Classification Search
USPC .......................................................... 318/799
See application file for complete search history.

(56) References Cited

U.S. PATENT DOCUMENTS

| | | | |
|---|---|---|---|
| 7,030,589 B2 | 4/2006 | Kaneko et al. | |
| 7,170,283 B2 | 1/2007 | Toyozawa et al. | |
| 2003/0052643 A1* | 3/2003 | Sweo | H02P 21/34 318/801 |
| 2007/0159130 A1* | 7/2007 | Kaneko | H02P 21/22 318/806 |
| 2014/0253001 A1* | 9/2014 | Hinata | H02P 21/24 318/400.02 |

FOREIGN PATENT DOCUMENTS

| | | |
|---|---|---|
| JP | 3971741 B2 | 9/2007 |
| JP | 2009254045 A | 10/2009 |
| JP | 2010220472 A | 9/2010 |
| WO | 2017199334 A1 | 11/2017 |

\* cited by examiner

MAGNETIC POLE POSITION DETECTION DEVICE

This is the U.S. National Phase application of PCT/JP2021/006645, filed Feb. 22, 2021, which claims priority to Japanese Patent Application No. 2020-030955, filed Feb. 26, 2020 the disclosures of these applications being incorporated herein by reference in their entireties for all purposes.

FIELD OF THE INVENTION

The present invention relates to a magnetic pole position detection device.

BACKGROUND OF THE INVENTION

In a synchronous motor, a current is flowed through an appropriate excitation phase winding in accordance with the magnetic pole position of a rotor by using a dq-coordinate control system to generate a desired torque. Synchronous motors are categorized into synchronous motors provided with a magnetic pole position sensor such as an encoder for detecting the magnetic pole position of the rotor and synchronous motors provided with no magnetic pole position sensor.

In a synchronous motor provided with no magnetic pole position sensor, magnetic pole position detection processing is performed at each powering-on (activation) of the synchronous motor to detect the initial position of the magnetic pole (hereinafter, referred to as a "magnetic pole initial position"), and the rotation of the synchronous motor is controlled on the basis of the magnetic pole position based on the detected magnetic pole initial position. A method for detecting the magnetic pole initial position is, for example, a direct-current excitation method in which a constant excitation current with a fixed current phase is continuously flowed through the synchronous motor, and the position of the stop in the end is set as the magnetic pole initial position.

With regard to the magnetic pole position detection of the synchronous motor, the following is described in paragraph 0014 of Patent Document 1: "By using this, in the present embodiment, a rotation direction of the rotor is detected first by causing a DC current to flow at a stator excitation phase of 180 degrees. When rotated in a positive direction, the rotor magnetic pole position (position of magnetic flux Φ) is within a region width of 180 to 360 degrees of the stator excitation phase; when rotated in a negative direction, the rotor magnetic pole position is within a region width of 0 to 180 degrees thereof. Subsequently, the DC current is similarly caused to flow at an excitation phase in the middle of the region where the rotor magnetic pole position is located (the region of 180 to 360 degrees or the region of 0 to 180 degrees), then the rotation direction of the rotor is detected, and the region where the rotor magnetic pole position is located is detected. The above-described processing is repeated to gradually reduce the region where the rotor magnetic pole position is located to a narrower region, whereby the rotor magnetic pole position is detected in the end".

With regard to the magnetic pole position detection of the synchronous motor, the following is described in Abstract of Patent Document 2: "Used is a rotation sensor 330 configured to output two analog signals such as a sine wave, a cosine wave and the like, and including a plurality of periods in one period of an electrical angle of a motor 300. At the start-up, a plurality of electrical angles corresponding to a plurality of absolute angle candidates obtained from rotation sensor signals are considered as motor initial positions, electricity is provided for a predetermined time at each electrical angle, and the electrical angle at which the motor acceleration becomes maximum is determined as the absolute angle".

PATENT LITERATURE

Patent Document 1: JP 3971741 B
Patent Document 2: JP 2010-220472 A

SUMMARY OF THE INVENTION

In magnetic pole initial position detection processing using a direct-current excitation scheme, for example, direct-current excitation is performed on a synchronous motor at a magnetic pole of 0 degrees and the processing waits for a rotor of the synchronous motor to stop. Then, after the rotor has stopped, the position at which the rotor has stopped is acquired as a magnetic pole initial position. In this manner, the time from the start of the direct-current excitation of the synchronous motor until the rotor of the synchronous motor stops is very long, and consequently acquisition of the magnetic pole initial position takes a long time. In particular, for a synchronous motor having a high acceleration performance with very little friction, such as a synchronous motor having a static pressure bearing, acquisition of the magnetic pole initial position may require several minutes. As such, a magnetic pole position detection device capable of shortening the detection time of the magnetic pole initial position of the rotor of the synchronous motor is desired.

An aspect of the present disclosure is a magnetic pole position detection device configured to detect a magnetic pole position of a rotor of a synchronous motor, the device including an excitation commanding section configured to excite the synchronous motor while changing a current phase of an excitation current for exciting the synchronous motor from an initial value that is preset, and a torque-zero determination section configured to determine whether torque generated on the rotor has become zero while the excitation current is flowing through the synchronous motor, wherein the excitation commanding section, after having excited the synchronous motor with the initial value of the current phase, continuously performs an operation of exciting the synchronous motor in such a manner that a value obtained by subtraction processing for subtracting, from the initial value, a phase angle corresponding to a cumulative value of a movement amount of the rotor from a start time point of exciting the synchronous motor with the initial value of the current phase, is taken as the current phase of the excitation current until the torque-zero determination section determines that the torque has become zero, and acquires the value obtained by the subtraction processing as a magnetic pole initial position at a time of determination made by the torque-zero determination section that the torque has become zero.

According to the configuration described above, it is possible to shorten the time required to detect the magnetic pole position as compared to a case in which a magnetic pole initial value is detected by performing excitation with a fixed current phase.

The objects, features and advantages as described above, and other objects. features, and advantages of the present invention will become more apparent from the following description of the embodiments in connection with the accompanying drawings.

BRIEF DESCRIPTION OF DRAWINGS

FIG. 13B is a diagram in which FIG. 13A is enlarged in a time axis direction.

DETAILED DESCRIPTION OF EMBODIMENTS OF THE INVENTION

Figure 1:
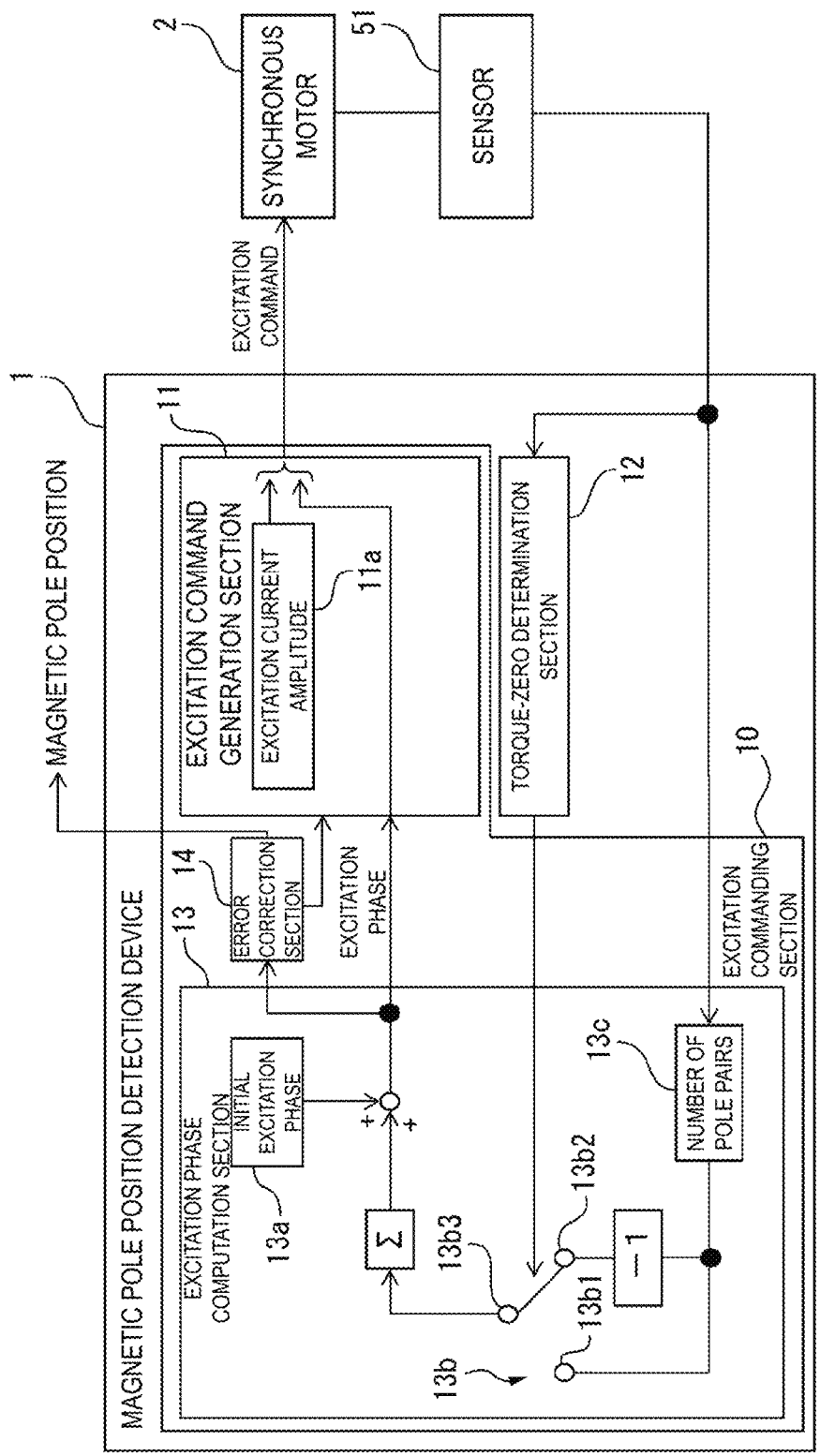
FIG. 1 is a block diagram illustrating a configuration of a magnetic pole position detection device according to the present embodiment.

Next, embodiments of the present disclosure will be described with reference to the drawings. In the referenced drawings, identical constituent elements or functional elements are given identical reference signs. For ease of understanding, these drawings are scaled as appropriate. The embodiments illustrated in the drawings are examples for implementing the present invention, and the present invention is not limited to the embodiments illustrated in the drawings.

Figure 2:
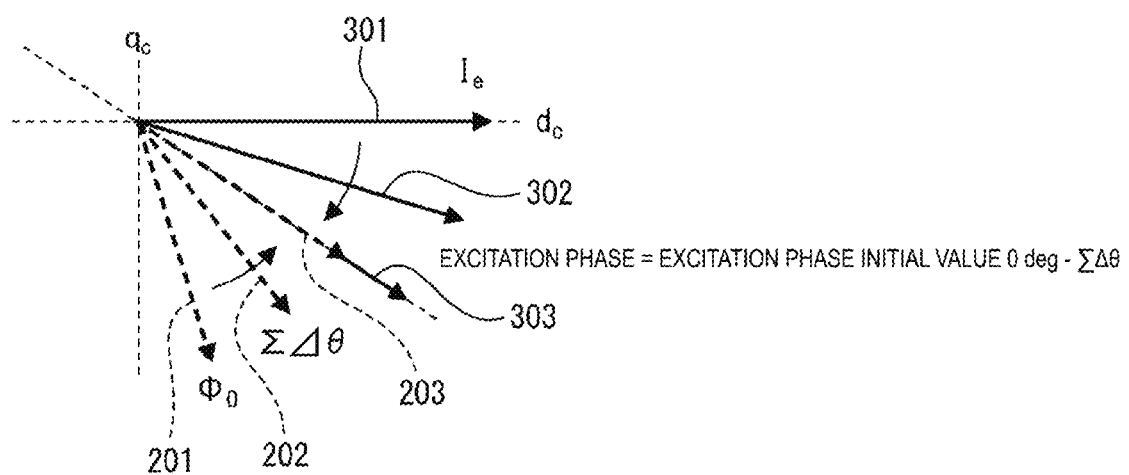
FIG. 2 is a diagram for describing a detection operation of a magnetic pole position in a magnetic pole position detection device.

FIG. 1 is a block diagram illustrating a configuration of a magnetic pole position detection device 1 according to an embodiment of the present disclosure. FIG. 2 is a diagram for describing a detection operation of a magnetic pole position in the magnetic pole position detection device 1. Prior to specifically describing the detection operation of the magnetic pole position by the magnetic pole position detection device 1, behavior of a rotor in a case where a constant excitation current with a fixed current phase is continuously flowed through (direct-current excitation is performed) in a synchronous motor will be described with reference to FIGS. 13A and 13B.

Figure 13A:
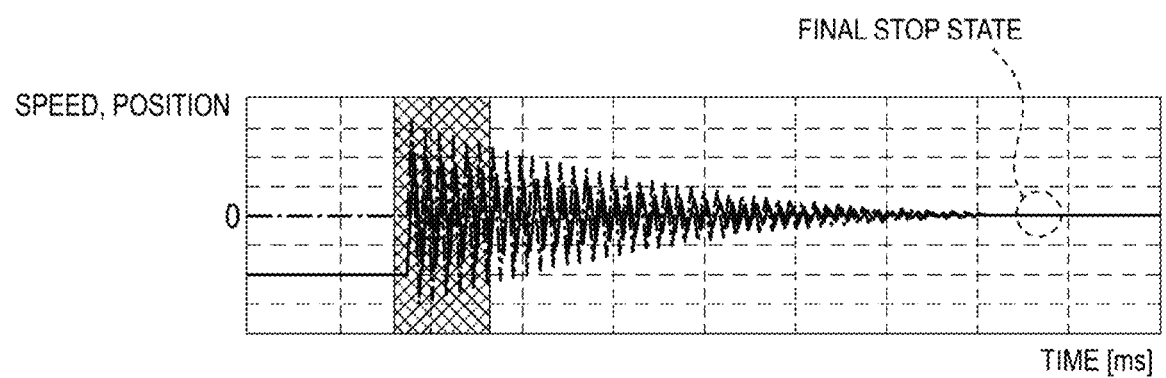
FIG. 13A is a diagram exemplifying behavior of a rotor of a synchronous motor when a constant excitation current with a fixed current phase is continuously flowed through the synchronous motor.
Figure 13B:
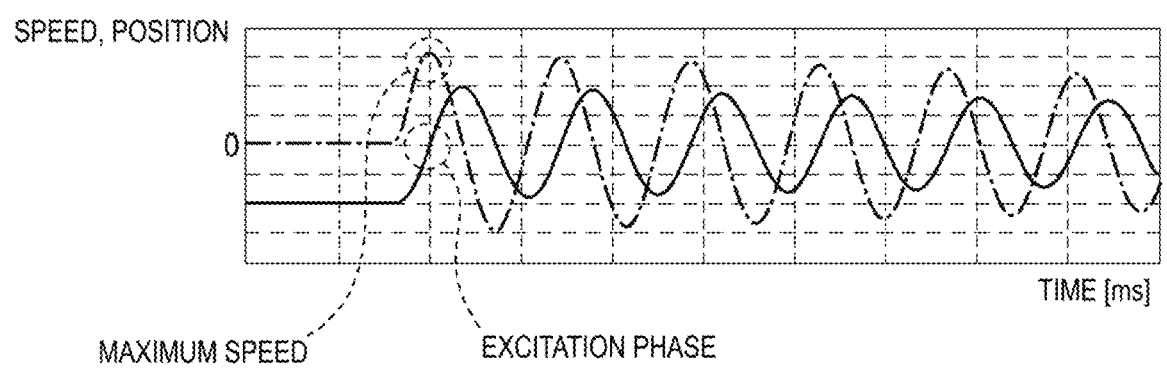

FIGS. 13A and 13B are diagrams exemplifying the behavior of the rotor of the synchronous motor when the constant excitation current with the fixed current phase is continuously flowed through the synchronous motor. FIG. 13A is a diagram exemplifying a speed and a position of the rotor as time passes, and FIG. 13B is a diagram obtained by enlarging FIG. 13A in a time axis direction. In FIGS. 13A and 13B, a solid line indicates a rotor actual position of the synchronous motor as time passes, and a single dot-dash line indicates a speed (rotational angular speed) of the synchronous motor. When the constant excitation current with the fixed current phase is continuously flowed through the synchronous motor, the rotor of the synchronous motor vibrates in a rotation direction as exemplified in FIGS. 13A and 13B. The vibration of the synchronous motor gradually attenuates, and the rotor finally stops at a phase angle position that matches an excitation phase.

It is possible to acquire the magnetic pole initial position by performing direct-current excitation and waiting for the rotor to stop as described above, but it takes a considerably long time for the rotor to stop. As compared to the case of the above-described excitation with the fixed current phase (the direct-current excitation scheme), the magnetic pole position detection device 1 according to the present embodiment largely shortens the time required to obtain the magnetic pole initial position.

As illustrated in FIG. 1, the magnetic pole position detection device 1 includes an excitation commanding section 10 and a torque-zero determination section 12. The excitation commanding section 10 excites a synchronous motor 2 while changing a current phase of an excitation current to excite the synchronous motor 2 from a preset initial value. The torque-zero determination section 12 determines whether the torque generated on the rotor has become zero while the excitation current is flowing through the synchronous motor 2. As described in detail below, the excitation commanding section 10, after having excited the synchronous motor 2 with an initial value of the current phase, continuously performs an operation of exciting the synchronous motor 2 in such a manner that a value obtained by subtraction processing for subtracting, from the initial value, a phase angle (electrical angle) corresponding to a cumulative value of a movement amount of the rotor from a start time point of exciting the synchronous motor 2 with the initial value of the current phase, is taken as the current phase of the excitation current until the torque-zero determination section 12 determines that the torque has become zero, and acquires the value obtained by the subtraction processing as a magnetic pole initial position at the time of the determination made by the torque-zero determination section 12 that the torque has become zero.

As illustrated in FIG. 1, the excitation commanding section 10 includes an excitation phase computation section 13 configured to compute the current phase in the magnetic pole detection operation, and an excitation command generation section 11 configured to generate an excitation command with respect to the synchronous motor 2. The excitation phase computation section 13 includes a storage section 13*a* configured to store an initial excitation phase which is an initial value of the excitation phase, sets the initial value of the excitation phase to the initial excitation phase in the magnetic pole detection operation, and continues to perform, after the start of the magnetic pole detection operation, an operation of outputting, as the current phase of the excitation current, a value obtained by the subtraction processing for subtracting, from the initial excitation phase, the phase angle (electrical angle) corresponding to the cumulative value of the movement amount of the rotor from the start time point of the magnetic pole detection operation until the torque-zero determination section 12 determines that the torque has become zero. The excitation command generation section 11 includes a storage section 11*a* configured to store a setting value of an excitation current amplitude, and generates an excitation command for causing a current having the setting value of the excitation current amplitude to flow at the excitation phase output from the excitation phase computation section 13. The excitation phase computation section 13 also includes a storage section 13*c* configured to store the number of pole pairs.

Figure 11:
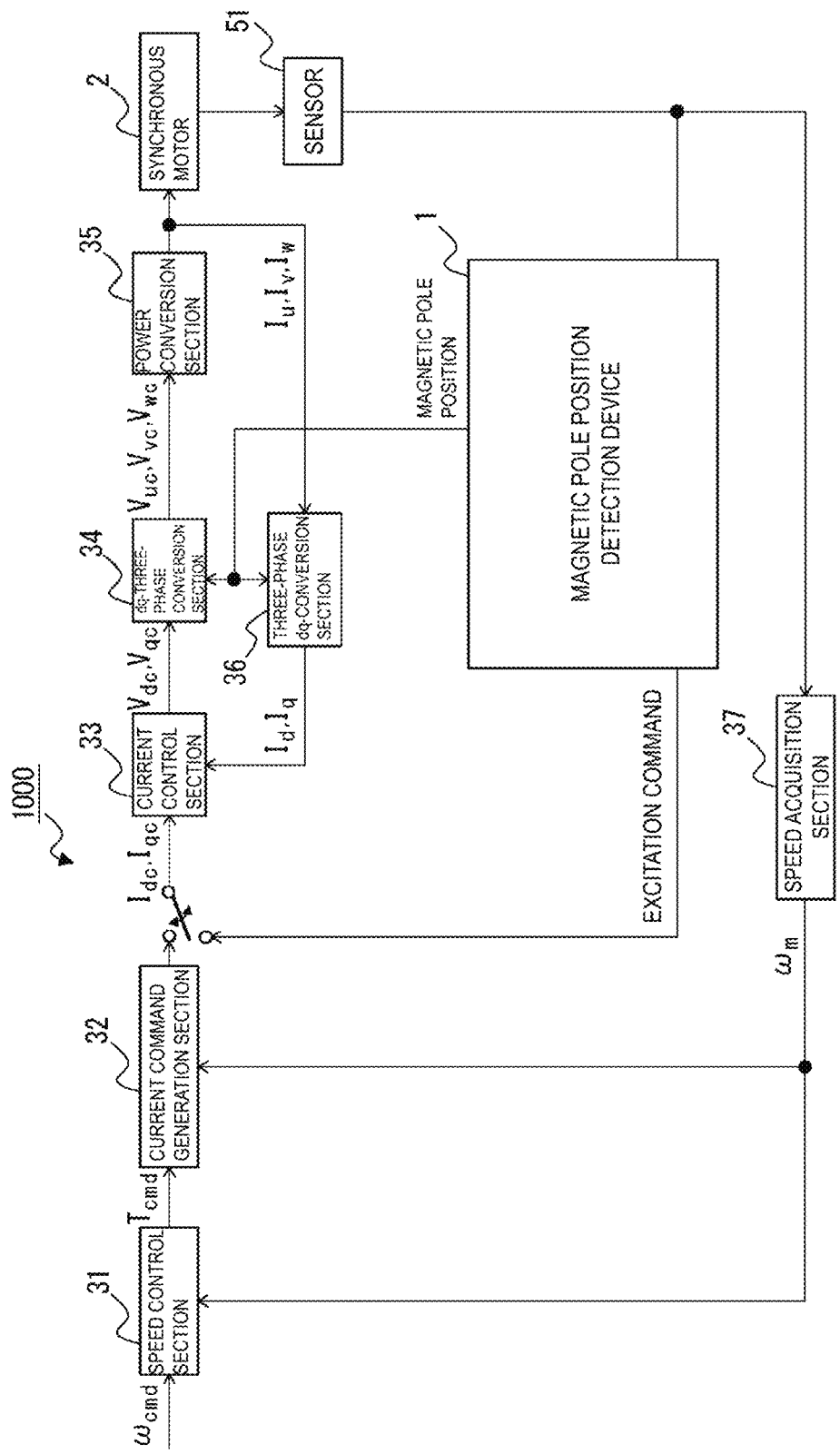
FIG. 11 is a block diagram illustrating a motor control device including the magnetic pole position detection device according to the present embodiment.

A command generated by the excitation command generation section 11 is sent to a current control section 33 in a motor control device 1000 configured to control the driving of the synchronous motor 2 (refer to FIG. 11). The current control section 33 in the motor control device 1000 generates a voltage command on the basis of the command received from the excitation command generation section 11 and the current feedback converted at a fixed current phase, and a power conversion section 35 generates a constant excitation current with a fixed current phase by applying a voltage to the synchronous motor 2 on the basis of the received voltage command.

With reference to FIGS. 1 and 2, the excitation operation by the magnetic pole position detection device 1 will be described in more detail. FIG. 2 is a diagram illustrating a transition of an excitation phase generated by the excitation phase computation section 13 on a dq-coordinate system according to the motor control device side. Here, the rotor (magnetic flux φ0) is assumed to be at an initial position denoted by a reference sign 201. A switching section 13*b* in the excitation phase computation section 13 operates in such a manner as to connect an output end 13*b*3 to an input end 13*b*2 while the torque-zero determination section 12 does not determine that the torque generated on the rotor of the synchronous motor 2 is zero, and switch the connection of the output end 13*b*3 to the side of an input end 13*b*1 when the torque-zero determination section 12 determines that the torque generated on the rotor has become zero.

According to the above configuration, the excitation phase computation section 13 outputs, as the excitation phase, the phase angle represented by the following mathematical equation until the torque-zero determination section 12 determines that the torque generated on the rotor has become zero.

Excitation phase(θ)=initial excitation phase value−ΣΔθ    (A1)

In the above mathematical equation (A1), Δθ is an incremental quantity of the phase angle (electrical angle) obtained by multiplying the movement amount of the rotor by the number of pole pairs, and ΣΔθ is a cumulative value of the movement amount of the rotor from the start time point of the magnetic pole detection operation. The mathematical equation (A1) represents that the excitation phase is subtracted from the initial excitation phase value accompanying the movement of the rotor. The update of such excitation phase may be performed on a predetermined cycle, for example. Here, as an example, the initial excitation phase value is set to be 0°. In this case, as illustrated in FIG. 2, the excitation is performed by a constant excitation current (excitation current amplitude value) with a phase angle of 0° at the start time of the magnetic pole position detection operation. An excitation current $I_e$ at this time is denoted by a reference sign 301 in FIG. 2. In FIG. 2, a counterclockwise direction is defined as a positive direction and a clockwise direction is defined as a negative direction. The torque acting on the rotor due to the excitation by the excitation current (reference sign 301) causes the rotor to be attracted toward the phase position of the excitation current (reference sign 301), so that the rotor starts a rotational movement (rotates in the positive direction in the example of FIG. 2). With the movement of the rotor, the excitation phase is subtracted, and the current phase of the excitation current rotates in the negative direction in FIG. 2, as indicated by reference signs 302 and 303 in FIG. 2. At this time, the rotor continues to rotate in the positive direction, and the phase angle position of the rotor and the phase angle position of the excitation current approach each other.

In a state in which the excitation current is at a position indicated by the reference sign 302, the rotor is still at a position (reference sign 202) in the negative direction with respect to the excitation current, so that the rotor continues to rotate in the positive direction. When the excitation current has reached a position indicated by the reference sign 303, the position of the rotor (indicated by a reference sign 203) and the position (phase angle) of the excitation current match each other. The state in which the phase angle of the rotor matches the phase angle of the excitation current $I_e$ is detected by the torque-zero determination section 12 as a state of torque zero.

The excitation phase (θ), represented by the mathematical equation (A1) when the torque zero is detected by the torque-zero determination section 12, represents the magnetic pole position (actual position of the rotor). In other words, the magnetic pole position detection device 1 detects the magnetic pole position by detecting the torque zero in the above operation. In this manner, the magnetic pole position obtained by detecting the torque zero is defined as the magnetic pole initial position.

When the torque zero is detected by the torque-zero determination section 12, the input end selection by the switching section 13*b* is switched. As a result, the excitation phase computation section 13 outputs, as the magnetic pole position, a value obtained by adding a cumulative value of the movement amount of the rotor (a value obtained by multiplying an incremental pulse quantity from a sensor 51 by the number of pole pairs) to the magnetic pole initial position (a mathematical equation (A2) given below).

Magnetic pole position=magnetic pole initial position+ΣΔθ    (A2)

In other words, after the magnetic pole initial position is detected, the excitation phase computation section 13 functions as a magnetic pole position counter.

Figure 3:
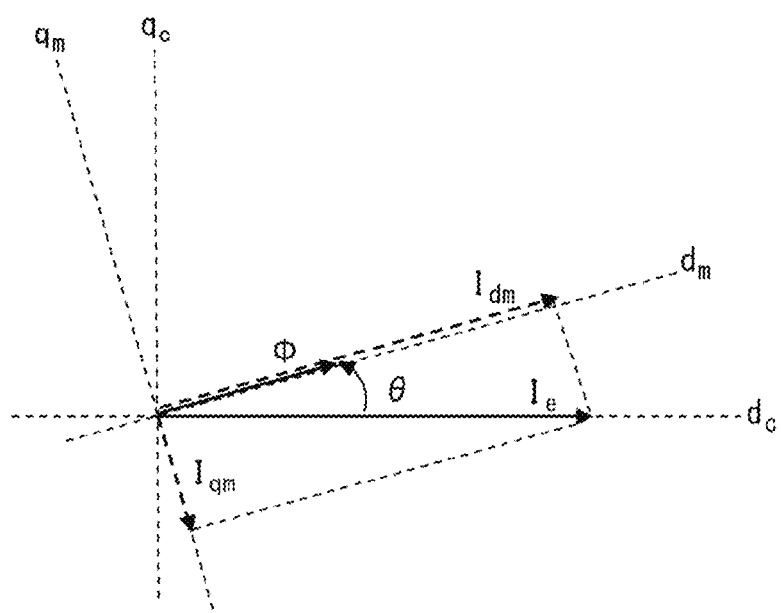
FIG. 3 is a diagram illustrating a relationship between a dq-coordinate system according to a synchronous motor and a dq-coordinate system according to a motor control device configured to control the synchronous motor.

Hereinafter, a technique for determining torque zero in the torque-zero determination section 12 will be described in detail. FIG. 3 is a diagram illustrating a relationship between a dq-coordinate system according to the synchronous motor and a dq-coordinate system according to the motor control device that controls the synchronous motor. The coordinate axes of the dq-coordinate system according to the synchronous motor are denoted by $d_m$ and $q_m$, and the coordinate axes of the dq-coordinate system according to the motor control device that controls the synchronous motor are denoted by $d_c$ and $q_c$. In addition, the deviation amount of the d-axis between the coordinate systems (i.e., the angle between the coordinate axis $d_m$ and the coordinate axis $d_c$) is denoted by θ. Note that the deviation amount θ is also the deviation amount of the q-axis between the coordinate systems (i.e., the angle between the coordinate axis $q_m$ and the coordinate axis $q_c$).

A constant excitation current with a current phase fixed at 0 degrees in the dq-coordinate system according to the motor control device is denoted by $I_e$. Here, the excitation current $I_e$ is expressed as Equation (1) in the dq-coordinate system according to the synchronous motor.

[Math. 1]

$$I_{dm} = I_e \cdot \cos\theta$$

$$I_{qm} = -I_e \cdot \sin\theta \qquad (1)$$

When the number of pole pairs of the synchronous motor 2 is denoted by pp, a main magnetic flux is denoted by Φ, a d-phase inductance is denoted by $L_d$, and a q-phase inductance is denoted by $L_q$, a torque $T_r$ generated when the excitation current $I_e$ is flowed through the salient-pole synchronous motor is expressed as Equation (2).

[Math. 2]

$$\begin{aligned} T_r &= pp \cdot \{\Phi - (L_q - L_d) \cdot I_{dm}\} \cdot I_{qm} \\ &= pp \cdot \{\Phi - (L_q - L_d) \cdot I_e \cdot \cos\theta\} \cdot (-I_e \cdot \sin\theta) \end{aligned} \qquad (2)$$

In addition, the d-phase inductance $L_d$ and the q-phase inductance $L_q$ are equal to each other in non-salient-pole synchronous motors (i.e., synchronous motors that do not have a salient pole). Accordingly, the torque $T_r$ that is generated when the excitation current $I_e$ is flowed through a non-salient-pole synchronous motor is expressed as Equation (3), which is obtained by transforming Equation (2).

[Math. 3]

$$T_r = pp \cdot \Phi \cdot (-I_e \cdot \sin\theta) \qquad (3)$$

As described above, when the excitation current is flowed through the synchronous motor, the rotor moves in the rotation direction and the deviation amount θ changes accordingly. Equations (2) and (3) include "sin θ", and when the deviation amount θ is zero, "sin θ" is zero, and accordingly the torque $T_r$ is zero. Conversely, when the torque $T_r$ is zero, "sin θ" in Equations (2) and (3) can be zero, i.e., the deviation amount θ can be zero. Therefore, during a constant excitation current being flowed through the synchronous motor, the magnetic pole initial position may be acquired by detecting a time point when the torque $T_r$ has become zero.

However, in the case of a salient-pole synchronous motor, "{Φ−(Lq−$L_d$)·Ie·cos θ}" in Equation (2) can be zero, i.e., the torque $T_r$ expressed in Equation 2 can be zero when θ has a value other than zero depending on the magnitude of the excitation current $I_e$. In other words, in the case of a salient-pole synchronous motor, the deviation amount θ is not necessarily zero even when the torque $T_r$ is zero. Accordingly, in the case where the present embodiment is applied to a salient-pole synchronous motor, it is necessary not to flow the excitation current $I_e$ that sets "{Φ−(Lq−Ld)·Ie·cos θ}" to zero. On the other hand, in the case of a non-salient-pole synchronous motor, the torque $T_r$ is represented by Equation 3, and therefore the torque $T_r$ is zero only when the deviation amount θ is zero. Accordingly, in the case where the present embodiment is applied to the non-salient-pole synchronous motor, it is unnecessary to set an upper limit for the constant excitation current $I_e$ with a fixed current phase.

Here, the magnitude of the excitation current $I_e$ to be flowed for acquiring the magnetic pole initial position of the salient-pole synchronous motor is described below with reference to FIGS. 4A, 4B, and 5.

Figure 4A:
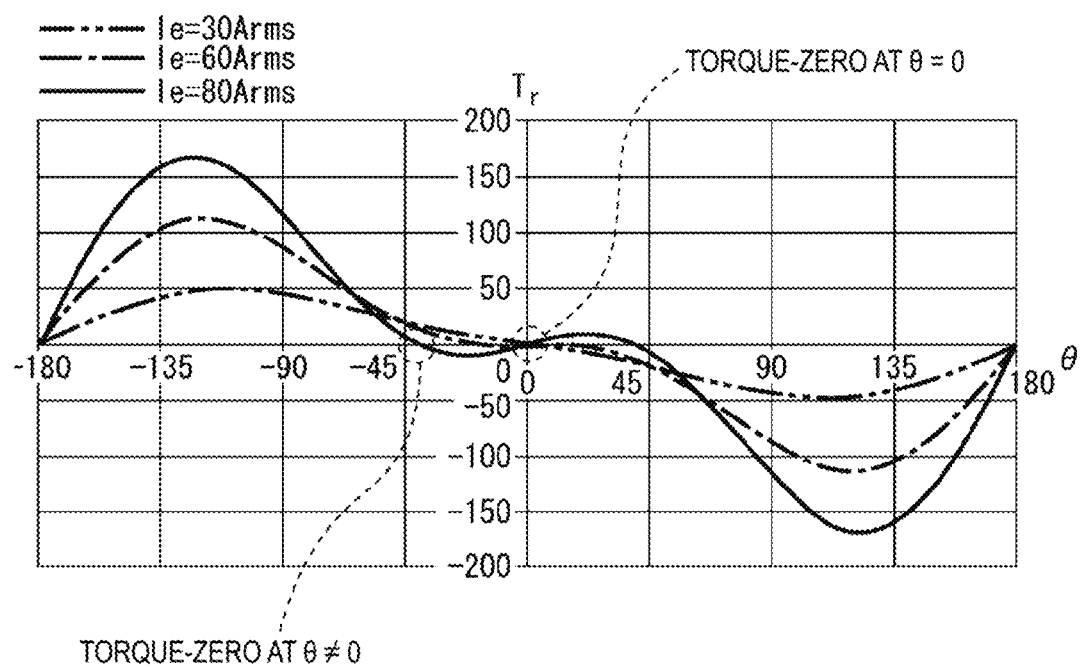
FIG. 4A is a diagram illustrating magnitude of an excitation current that is flowed for acquiring a magnetic pole initial position of a salient-pole synchronous motor.
Figure 4B:
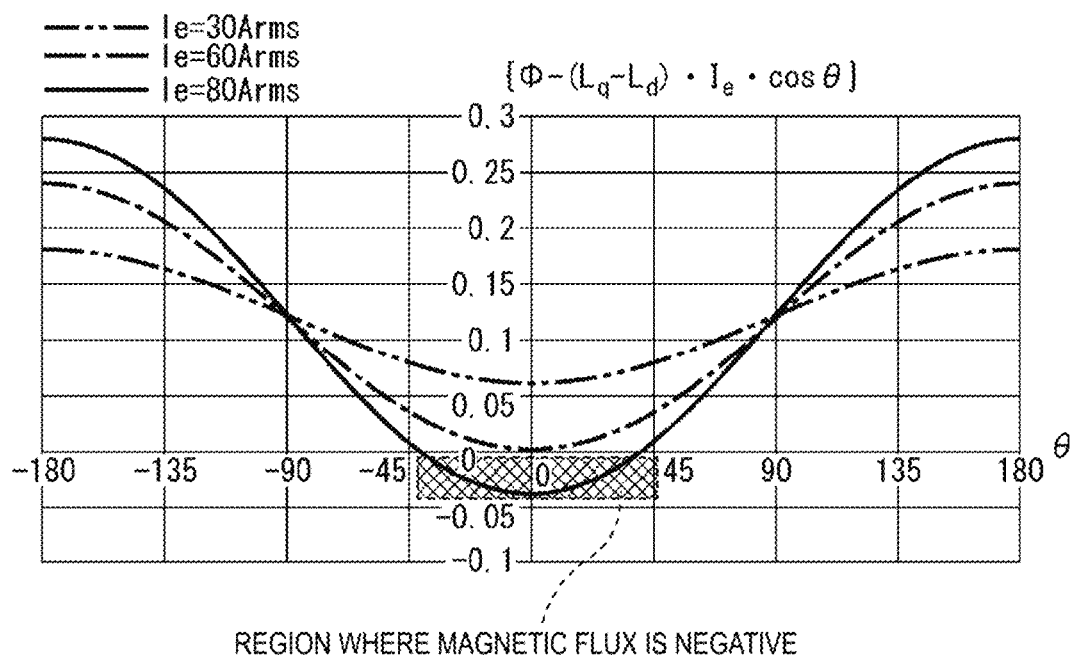
FIG. 4B is a diagram illustrating magnitude of an excitation current that is flowed for acquiring a magnetic pole initial position of a salient-pole synchronous motor.

FIGS. 4A and 4B are diagrams illustrating magnitudes of an excitation current that is flowed for acquiring the magnetic pole initial position of the salient-pole synchronous motor. In FIG. 4A, the horizontal axis indicates the deviation amount θ, and the vertical axis indicates the torque $T_r$. In FIG. 4B, the horizontal axis indicates the deviation amount θ, and the vertical axis indicates the value obtained by dividing the equation of the generated torque by the q-phase current. In FIGS. 4A and 4B, the double dot-dash line indicates a case where the excitation current $I_e$ is 30 Arms, the single dot-dash line indicates a case where the excitation current $I_e$ is 60 Arms, and the solid line indicates a case where the excitation current $I_e$ is 80 Arms. Note that the magnitude of the excitation current $I_e$ illustrated in FIGS. 4A and 4B is merely an example.

When the excitation current $I_e$ is 30 Arms or 60 Arms, the torque $T_r$ is zero only when the deviation amount θ is zero as illustrated in FIG. 4A. In contrast, when the excitation current $I_e$ is 80 Arms, the torque $T_r$ is zero not only when the deviation amount θ is zero, but also when the deviation amount θ is at or near "−44 degrees". The reason for the occurrence of such a situation where the torque $T_r$ becomes zero also when the deviation amount θ has a value other than zero in the case of the excitation current $I_e$ of 80 Arms is that the value obtained by dividing the equation of the generated torque by the q-phase current has a negative region as illustrated in FIG. 4B. Accordingly, in the case where the present embodiment is applied to the salient-pole synchronous motor, it is necessary to set the excitation current $I_e$ that sets the torque $T_r$ expressed in Equation 2 to be positive (i.e., a value greater than zero) in all cases where the deviation amount θ is not zero. The details are as follows.

Inequality 4 is obtained by applying "$T_r > 0$" and "θ≠0" to Equation 2 and then transforming Equation 2.

[Math. 4]

$$\Phi - (L_q - L_d) \cdot I_e \cdot \cos\theta > 0 \qquad (4)$$

In Inequality 4, "−1≤cos θ≤1" holds, and therefore Inequality 5 is obtained from Inequality 4.

[Math. 5]

$$\Phi - (L_q - L_d) \cdot I_e > 0 \qquad (5)$$

Inequality 6 is obtained by transforming Inequality 5.

[Math. 6]

$$I_e < \frac{\Phi}{L_q - L_d} \qquad (6)$$

Accordingly, in the case where the present embodiment is applied to the salient-pole synchronous motor, the constant excitation current $I_e$ with the fixed current phase needs to be set to a magnitude that satisfies Inequality 6. In the present embodiment, when the synchronous motor from which the magnetic pole initial position is acquired is the salient-pole synchronous motor, the excitation command generation section 11 generates a command to flow the excitation current $I_e$ smaller than an upper limit value "Φ/(Lq−Ld)" through the synchronous motor 2.

Note that the main magnetic flux 1 decreases as the temperature of the permanent magnet provided in the synchronous motor 2 increases. Accordingly, the upper limit value of the excitation current $I_e$ may be set in consideration of the anticipated temperature rise in the permanent magnet at the time of driving the synchronous motor 2 having a salient pole. Here, the magnitude of the excitation current $I_e$ to be flowed for acquiring the magnetic pole initial position, in consideration of the temperature rise in the permanent magnet of the salient-pole synchronous motor, is described with reference to FIG. 5.

Figure 5:
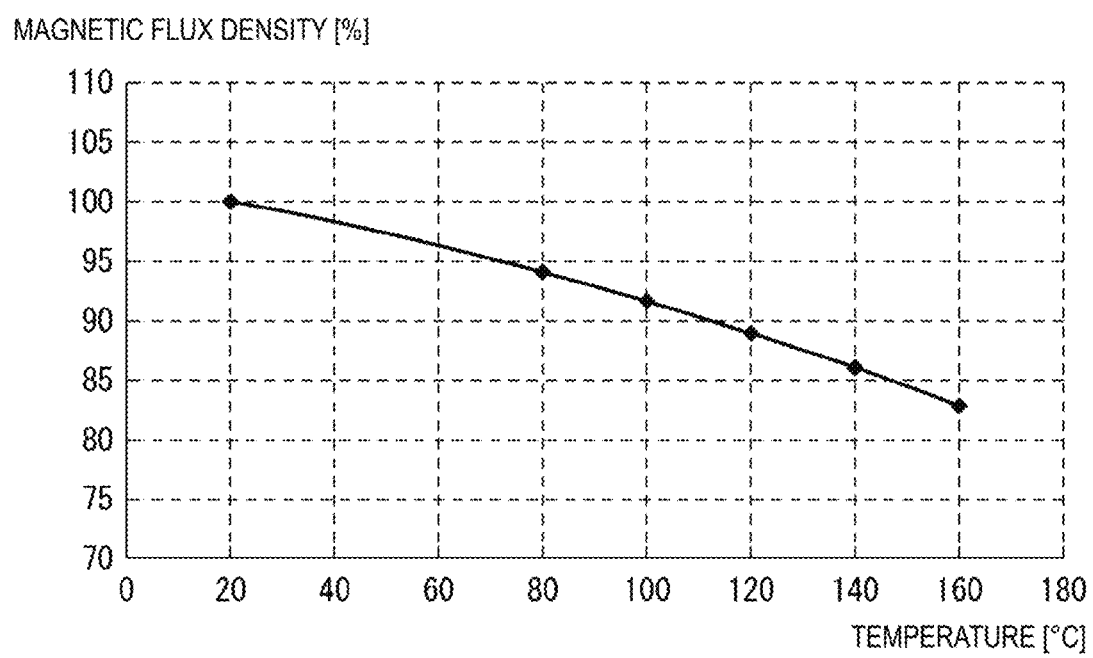
FIG. 5 is a diagram exemplifying a relationship between a temperature of a permanent magnet provided in a synchronous motor and a magnetic flux density of a main magnetic flux of the synchronous motor.

FIG. 5 illustrates a relationship between a temperature of a permanent magnet provided in a synchronous motor and a magnetic flux density of a main magnetic flux of the synchronous motor. In FIG. 5, the horizontal axis indicates the temperature of the permanent magnet provided in the synchronous motor 2, and the vertical axis indicates the ratio of the magnetic flux density in the case where the permanent magnet has a magnetic flux density of 100% when the permanent magnet is at 20° C. Note that the numerical values shown in FIG. 5 are merely examples, and may be set to other numerical values. For example, in the case where the anticipated maximum temperature of the permanent magnets at the time of driving the synchronous motor 2 having a salient pole is 160 degrees, the excitation current $I_e$ is limited in consideration of an anticipated magnetic flux $\Phi_{min}$ (the smallest magnetic flux density) at the maximum temperature of the permanent magnet of the synchronous motor 2 so that the generated torque does not become zero when the deviation amount θ is not zero even when the permanent magnet is at 160 degrees. Thus, Inequality 7 may be obtained from Inequality 6.

[Math. 7]

$$I_e < \frac{\Phi_{min}}{L_q - L_d} \quad (7)$$

Accordingly, in the case where the present embodiment is applied to the salient-pole synchronous motor, the constant excitation current $I_e$ with the fixed current phase may be set to a magnitude that satisfies Inequality 7 in consideration of the temperature rise in the permanent magnet that is anticipated at the time of driving the synchronous motor. In this case, the excitation command generation section 11 generates a command to flow the excitation current $I_e$ smaller than an upper limit value "Φmin/(Lq−Ld)" through the synchronous motor 2.

When the torque $T_r$ generated on the rotor of the synchronous motor 2 becomes zero, acceleration of the rotor of the synchronous motor 2 becomes zero. A situation in which the acceleration becomes zero may be detected as a time point at which the polarity of the acceleration changes from being positive to negative, or negative to positive. In addition, a speed of the synchronous motor 2 is highest (maximized) at the point in time when the polarity of the acceleration of the synchronous motor 2 changes from positive to negative, and the speed of the synchronous motor 2 is lowest (minimized) at the point in time when the polarity of the acceleration of the synchronous motor 2 changes from negative to positive. Accordingly, in the present embodiment, the torque-zero determination section 12 acquires the acceleration (of the rotor) of the synchronous motor 2, and determines the point in time when the polarity of the acceleration of the synchronous motor 2 is changed as the point in time when the torque has become zero. Alternatively, the torque-zero determination section 12 acquires the speed (of the rotor) of the synchronous motor 2, and determines the point in time when the speed of the synchronous motor 2 is maximized or minimized as the point in time when the torque has become zero. The acceleration of the synchronous motor 2 may be acquired through second-order differentiation of the rotor actual position represented by the incremental pulse quantity from the sensor 51. The speed of the synchronous motor 2 may be acquired through first-order differentiation of the rotor actual position represented by the incremental pulse quantity from the sensor 51. The differential calculation processing of the rotor actual position is performed in the torque-zero determination section 12.

Figure 6:
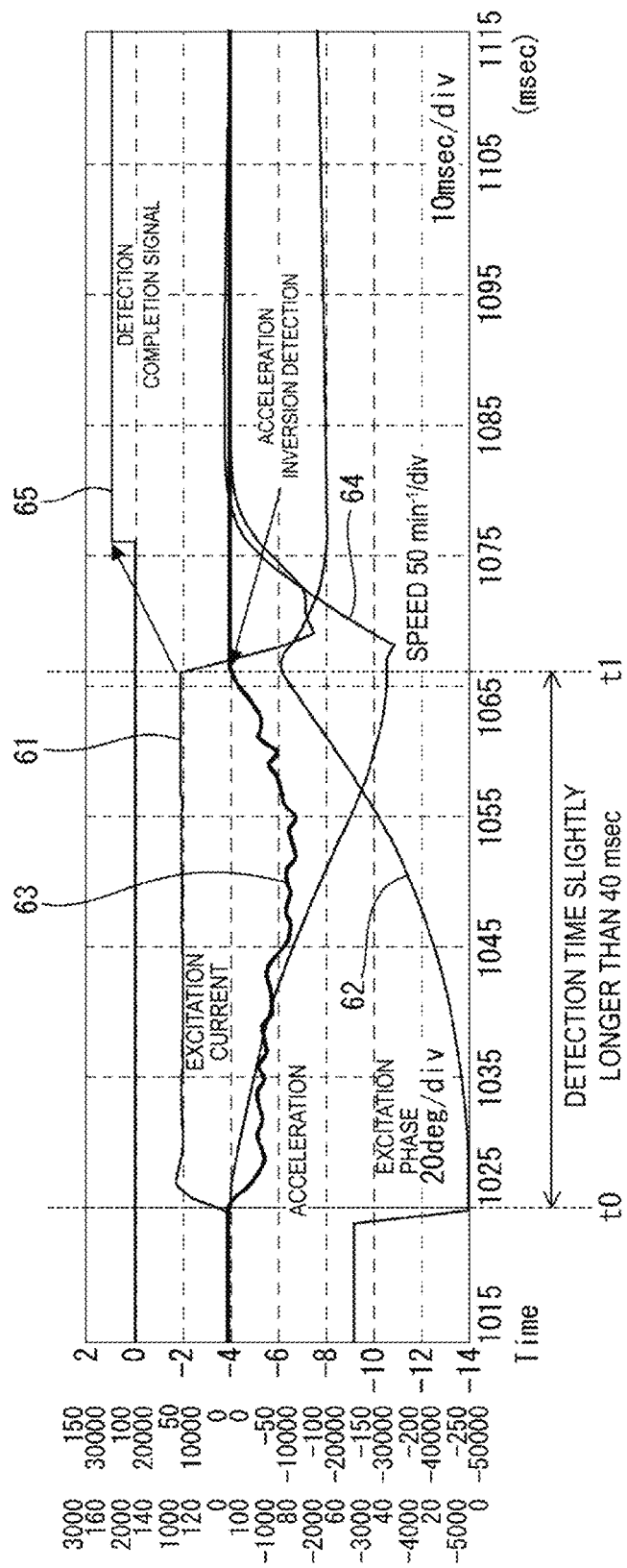
FIG. 6 is a waveform diagram illustrating an example of changes in excitation current, excitation phase, and acceleration and speed of a rotor in a magnetic pole position detection operation.

FIG. 6 is a waveform diagram illustrating an example of changes in excitation current, excitation phase, and acceleration and speed of the rotor in the magnetic pole position detection operation described above with reference to FIG. 2. In FIG. 6, a waveform representing the excitation current is denoted by a reference sign 61 (hereinafter, referred to as the excitation current 61), a waveform representing a change in the excitation phase is denoted by a reference sign 62 (hereinafter, referred to as the excitation phase 62), and a waveform representing a change in the acceleration of the rotor is denoted by a reference sign 63 (hereinafter, referred to as acceleration 63), and a waveform diagram representing a change in the speed of the rotor is denoted by a reference sign 64 (hereinafter, referred to as speed 64). FIG. 6 also depicts a detection completion signal 65 (active high signal) indicating that the magnetic pole initial position has been detected. In FIG. 6, the horizontal axis represents time, and the vertical axis represents the magnitude of each of physical quantities. In FIG. 6, time t0 is a time at which the magnetic pole position detection operation starts, and time t1 is a time at which the magnetic pole position detection operation is completed.

As described above, at the start time of the magnetic pole position detection operation (time t0), the excitation is performed by a constant excitation current at the initial excitation phase (refer to the excitation current 61 and the excitation phase 62). The excitation phase 62 gradually changes from the initial excitation phase value with the movement of the rotor. In FIG. 6, there is illustrated an operation example of a case in which the excitation phase 62 gradually changes from the initial excitation phase value (0 degrees) in the positive direction because the initial position of the rotor is located on the positive side relative to the initial excitation phase value. Torque with respect to the rotor is generated accompanying the application of the excitation current 61, and the rotor starts to move. This results in the generation of the acceleration 63. The excitation phase 62 and the position of the rotor consequently match each other due to the change of the excitation phase 62, and the acceleration becomes zero (time t1). The torque-zero determination section 12 determines that the torque has become zero by detecting the inversion of acceleration near the time t1, for example. When the torque-zero determination section 12 determines the torque zero, the torque-zero determination section 12 may generate the detection completion signal 65. The detection completion signal 65 may be used for switching the switching section 13b.

The rotor speed indicates a peak at a timing at which the acceleration polarity is inverted as depicted in FIG. 13B. By detecting the peak (maximum or minimum value) of the speed discussed above, the torque zero may be detected.

Figure 7:
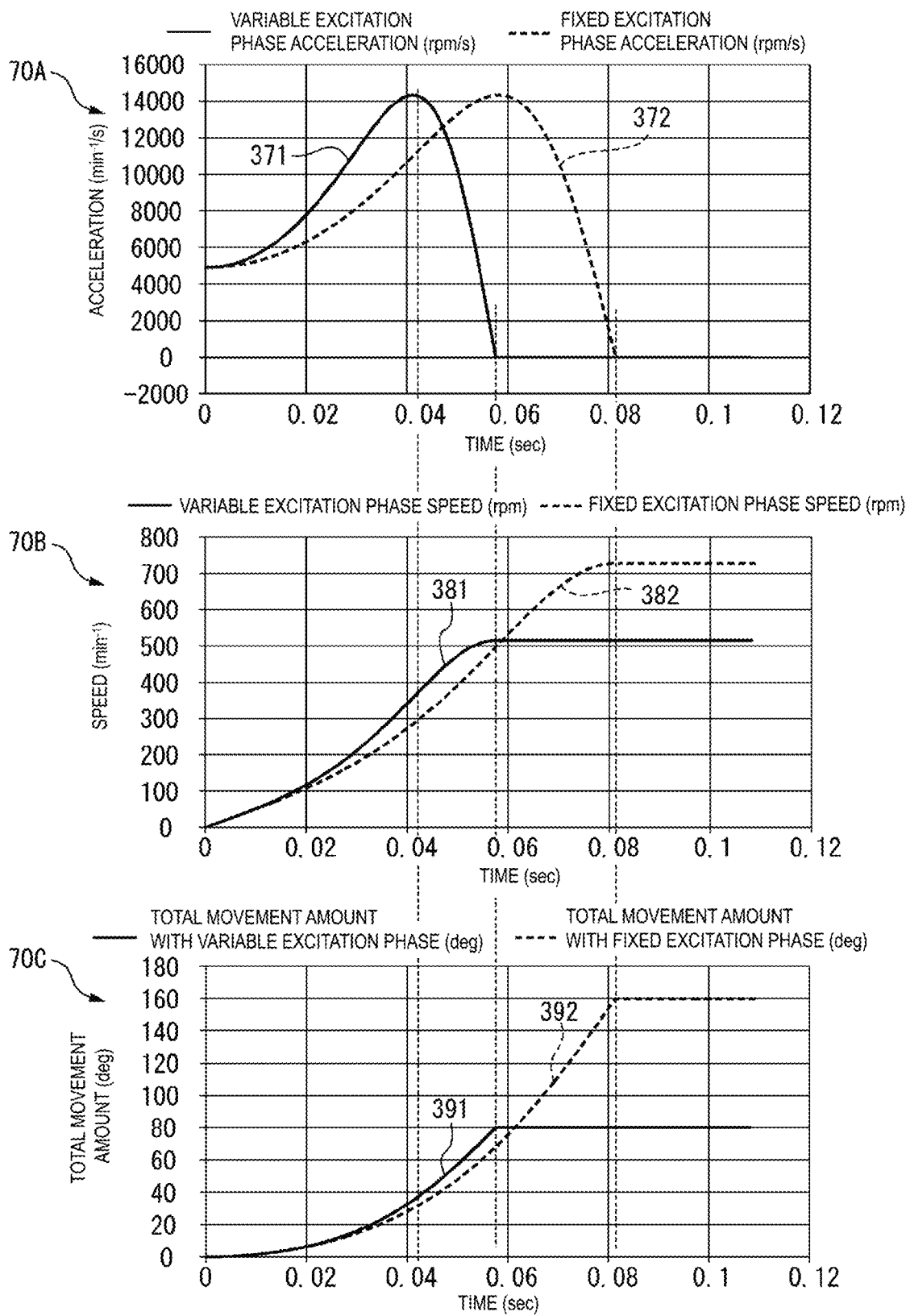
FIG. 7 includes graphs depicting each of transitions of acceleration, speed, and total movement amounts (cumulative movement amounts) of a rotor in a magnetic pole position detection operation according to the present embodiment, and as a comparative example, also depicting each of transitions of acceleration, velocity, and total movement amounts (cumulative movement amounts) of a rotor when excitation is performed with a fixed current phase.

FIG. 7 depicts each of transitions of the acceleration, speed, and total movement amounts (cumulative movement amounts) of the rotor in the magnetic pole position detection operation according to the present embodiment (i.e., the excitation operation with a variable excitation phase), and as a comparative example, also depicts each of transitions of the acceleration, speed, and total movement amounts (cumulative movement amounts) of the rotor when the excitation is performed with a fixed current phase. In this case, at the start time of the magnetic pole position detection operation, the relationship between the excitation phase and the initial position of the rotor is made to be matched between the present embodiment and the comparative example.

In acceleration characteristics 70A of FIG. 7, a graph 371 shown in a solid line represents an example of a time transition of the acceleration in the magnetic pole position detection operation according to the present embodiment, and a graph 372 shown in a broken line represents an example of a time transition of the acceleration of the rotor in the comparative example. As depicted in the acceleration characteristics 70A of FIG. 7, it is understood that, in the case of the comparative example, a time of approximately 80 ms is required until the acceleration first becomes zero, whereas in the case of the magnetic pole position detection operation according to the present embodiment, the acceleration becomes zero (the excitation phase matches the rotor position) in approximately 60 ms, thereby shortening the time required to acquire the magnetic pole initial position as compared to the comparative example (in which the excitation phase is fixed).

In speed characteristics 70B of FIG. 7, a graph 381 shown in a solid line represents a time transition of the speed of the rotor in the magnetic pole position detection operation according to the present embodiment, and a graph 382 shown in a broken line represents a time transition of the speed of the rotor in the comparative example. From the speed characteristics 70B of FIG. 7, it may be understood that the speed of the rotor at the time point of detection of the magnetic pole initial value can be reduced in the case of the magnetic pole position detection operation according to the present embodiment as compared to the case of the comparative example.

In total movement amount characteristics 70C of FIG. 7, a graph 391 shown in a solid line represents a time transition of the cumulative movement amount of the rotor in the magnetic pole position detection operation according to the present embodiment, and a graph 392 shown in a broken line represents a time transition of the cumulative movement amount of the rotor in the comparative example. From the total movement amount characteristics 70C of FIG. 7, it may be understood that the cumulative movement amount of the rotor at the time point of detection of the magnetic pole initial value can be reduced in the case of the magnetic pole position detection operation according to the present embodiment as compared to the case of the comparative example.

Figure 8:
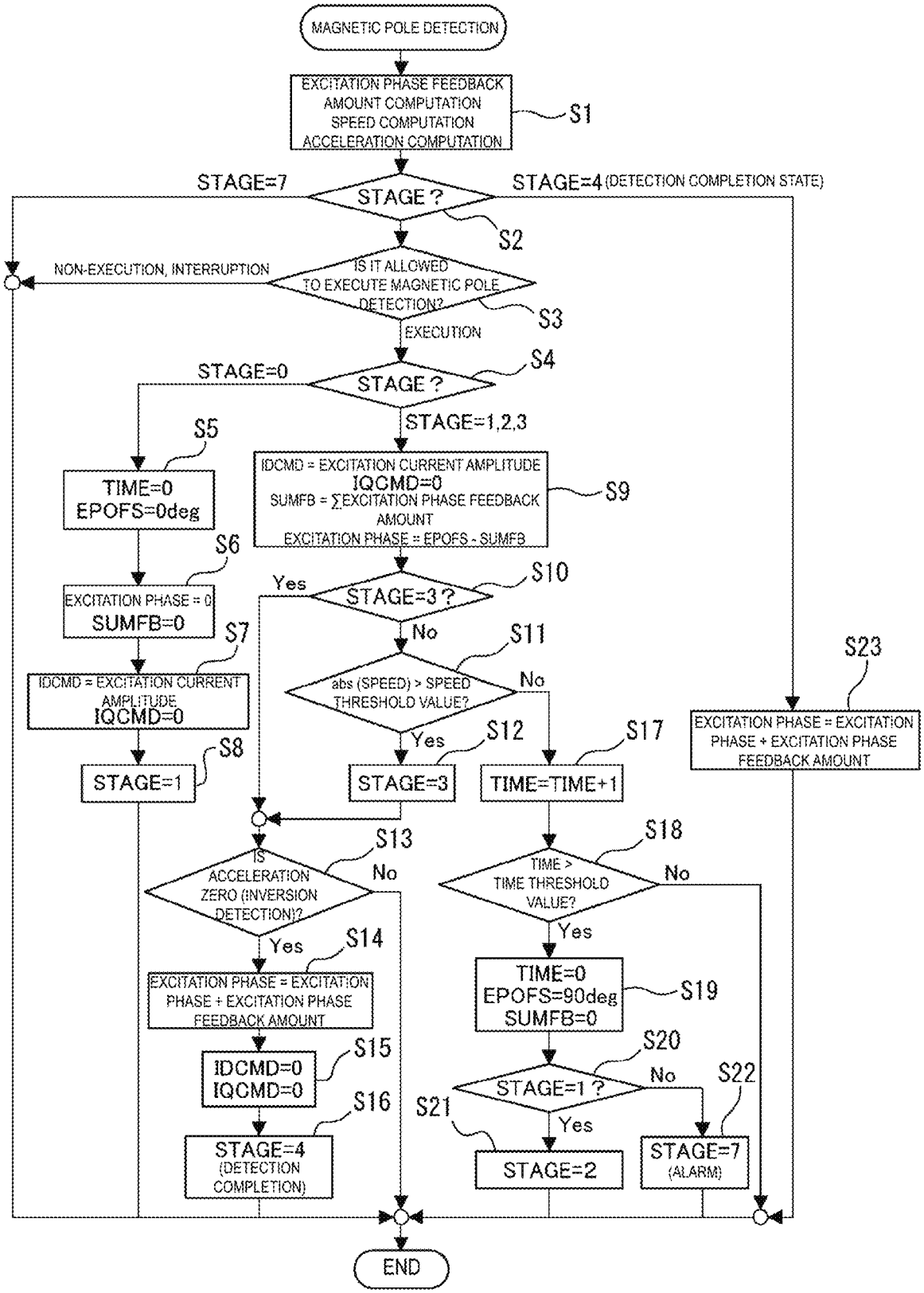
FIG. 8 is a flowchart illustrating processing of a magnetic pole position detection operation.

FIG. 8 is a flowchart illustrating processing of implementing the magnetic pole position detection operation described above with reference to FIG. 1. In step S1 to be performed first, the computation of the movement amount of the rotor (referred to as an excitation phase feedback amount in FIG. 8), and the speed and acceleration of the rotor is carried out on the basis of the incremental pulse signal from the sensor 51. Subsequently, the value of a variable STAGE is confirmed (step S2). It is assumed that the variable STAGE has been initialized first to be zero. In this case, the processing proceeds to step S3, and it is determined whether the magnetic pole detection is allowed to be performed. The processing proceeds to step S4 as long as any factor that interrupts or does not execute the magnetic pole position detection operation is not generated (S3: EXECUTION). In the case where there exists a factor that interrupts or does not execute the magnetic pole position detection operation, the processing goes to the end.

Subsequently, in step S4, the value of the variable STAGE is confirmed. Because the STAGE equals 0 in the first stage, the processing proceeds to step S5. In step S5, a variable TIME representing the passage of time is initialized to be zero, and a value of zero representing the initial excitation phase value being 0° is substituted for a variable EPOFS. Subsequently, in step S6, the excitation phase is initialized to be zero, and a variable SUMFB representing a cumulative value ($\Sigma\Delta\theta$) of the excitation phase feedback amount is initialized to be zero. Subsequently, an excitation current amplitude value held in the storage section 11a is substituted for a variable IDCMD representing a dc-axis excitation current command, zero is substituted for a variable IQCMD representing a qc-axis excitation current command, and the excitation is performed (step S7). In other words, the excitation with the initial excitation phase value being 0° is started. Thereafter, the variable STAGE is updated to 1 (step S8), the processing goes to the end, and then the processing from step S1 is performed again.

When the processing from step S1 is performed again with the variable STAGE equal to 1, it is determined in step S4 that the value of the variable STAGE is 1, and then the processing proceeds to step S9. In step S9, the excitation current amplitude value held in the storage section 11a is substituted for the variable IDCMD representing the dc-axis excitation current command, and zero is substituted for the variable IQCMD representing the qc-axis excitation current command. Further, here, the value of the cumulative value $\Sigma\Delta\theta$ of the excitation phase feedback amount ($\Delta\theta$) obtained in step S1 is substituted for the variable SUMFB, and the excitation phase is updated based on a formula of excitation phase=EPOFS−SUMFB. In other words, the excitation phase is a value obtained by subtraction processing of subtracting a phase angle corresponding to the movement amount of the rotor from the initial excitation phase value. In step S9, the excitation by these excitation commands is performed.

Subsequently, in step S10, the value of the variable STAGE is confirmed. Because the variable STAGE is equal to 1 in this stage, the processing proceeds to step S11. In step S11, it is determined whether the speed of the rotor has exceeded a predetermined speed threshold value. In a case where the speed of the rotor has not exceeded the speed threshold value (S11: NO), the processing proceeds to step S17. In a case where the speed of the rotor has exceeded the speed threshold value (S11: YES), the processing proceeds to step S12. Here, it is assumed that the speed of the rotor has not exceeded the speed threshold value yet (S11: NO).

In step S17, the variable TIME is incremented. Then, in step S18, it is determined whether the variable TIME has exceeded a predetermined time threshold value. Here, because the variable TIME has not exceeded the time threshold value yet (S18: NO), the processing goes to the end; then the performing of the processing from step S1 is continued.

When the determination made in step S18 is "NO" and the processing from step S1 is started, it is determined that the variable STAGE is equal to 1 in step S4. Then, in step S9, the excitation is performed at the excitation phase updated with $\Sigma\Delta\theta$ corresponding to the movement amount of the rotor. Subsequently, in step S10, it is determined that the variable STAGTE is unequal to 3 (S10: NO), and the processing proceeds to step S11. Here, assume that it is determined that the speed of the rotor has exceeded the speed threshold value due to the increase in the speed of the rotor (S11: YES). In this case, the processing proceeds to step S12, and the variable STAGE is updated to 3.

Subsequently, in step S13, it is determined whether the acceleration of the rotor is zero (i.e., whether the polarity of the acceleration of the rotor has been inverted). In a case where it is determined that the acceleration is zero (S13: YES), the processing proceeds to step S14. In a case where it has not been detected yet that the acceleration is zero (S13: NO), the processing goes to the end and the performing of the processing from step S1 is continued. In the case where it has not been detected yet that the acceleration is zero (S13: NO), after the processing from step S1 is started, the determination of "YES" is made in step S10 and the determination in step S13 is made again.

Assume that it is determined that the acceleration of the rotor is zero accompanying the movement of the rotor (S13: YES). In this case, in step S14, the computation equation for updating the excitation phase is switched to an equation in which the excitation phase feedback amount (LAO) is added to the excitation phase as described below.

Excitation phase=excitation phase+excitation phase feedback amount

The excitation phase represented by this equation represents the magnetic pole position (present value) of the rotor.

Subsequently, in step S15, the variable IDCCMD representing the dc-axis excitation command is made equal to 0, and the variable IQCCMD representing the qc-axis excitation command is made equal to 0. With this, the magnetic pole position detection is completed, and the variable STAGE is updated to 4 (step S16). When the processing is performed from step S1 in the state in which the magnetic pole position detection is completed, it is determined that the STAGE equals 4 in step S2, and update processing based on the equation of excitation phase=excitation phase+excitation phase feedback amount (i.e., processing to update the counter indicating the magnetic pole position in accordance with the movement of the rotor) is continuously performed (step S23).

When the determination of "NO" is made in step S11 and it is determined in step S18 that the variable TIME has exceeded the time threshold value (S18: YES), the following situation may be considered: a situation in which the rotor does not move because the magnetic pole position of the rotor is located at a position inverted 180 degrees with respect to the excitation phase, a situation in which the rotor is unable to move because the rotor is in a restricted state, or the like. In this case, the initial excitation phase (EPOFS) is changed from 0° to 90°, and the variable TIME and variable SUMFB are respectively initialized to be 0 (step S19). Then, when the variable STAGE equals 1 (S20: YES), in order to start the magnetic pole position detection operation at 90 degrees of the initial excitation phase, the variable STAGE is updated to 2 (step S21), the processing goes to the end, and the performing of the processing from step S1 is continued.

On the other hand, when it is determined that the variable STAGE is unequal to 1 in step S20, a situation is conceivable in which the rotor is in some sort of restricted state such as being fixed by a clasp, and therefore an alarm is issued by making the variable STAGE equal to 7 and the processing goes to the end (step S22). When the variable STAGE equals 7, the magnetic pole position detection operation is not performed due to the determination made in step S2.

The magnetic pole position (magnetic pole initial position) detected by the magnetic pole position detection device 1 in the manner described above may have an error depending on, for example, a sampling cycle of the signal from the sensor 51 or the like. The magnetic pole position detection device 1 may include an error correction section 14 configured to perform an operation of eliminating an error included in the detected magnetic pole position. The error correction section 14 performs at least any one of error correction operations 1 and 2 described below.

Error Correction Operation 1

In the error correction operation 1, a magnetic pole position detected by the magnetic pole position detection operation described above is taken as a temporarily confirmed value, and error correction is performed in the following procedure.

(Procedure A1) After the completion of the magnetic pole position detection by the magnetic pole position detection operation, a command of speed zero is issued to stop the rotor.

(Procedure A2) After the rotor is stopped, the excitation current is caused to flow with the stopping current phase being fixed, and when a predetermined time has passed since the stop, the excitation position of the fixed current phase is used as the magnetic pole initial position.

Figure 9:
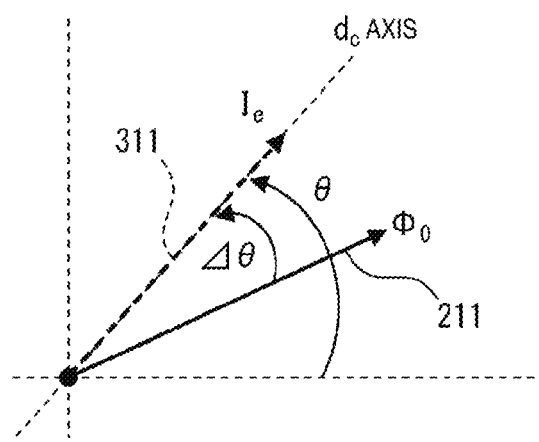
FIG. 9 is a diagram for describing a first example of an error correction operation.

FIG. 9 is a diagram for describing the error correction operation 1. In FIG. 9, the phase of a position of the stop with the speed being zero is denoted by θ. Assume that a direction (reference sign 211) of the main magnetic flux $\varphi_0$ is deviated by $\Delta\theta$ from a direction (dc-axis direction) of the fixed excitation current due to an error of the magnetic pole position detection. In this case, when the excitation current $I_e$ (reference sign 311) is caused to flow with the stopped dc-axis phase being fixed, the main magnetic flux $\varphi_0$ is attracted to move toward the dc-axis by $\Delta\theta$ and stops. The error correction is completed when a certain amount of time (predetermined time) has passed. With this, the error $\Delta\theta$ of the magnetic pole position is eliminated.

Error Correction Operation 2

In the error correction operation 2, a magnetic pole position detected by the magnetic pole position detection operation described above is taken as a temporarily confirmed value, and error correction is performed in the following procedure.

(Procedure B1) After the completion of the magnetic pole position detection by the magnetic pole position detection operation, the rotor is made to rotate at a constant speed.

(Procedure B2) The magnetic pole position at the time point when a one-rotation signal is detected from the sensor 51 provided in the synchronous motor 2 is replaced with a preset magnetic pole position offset ($\theta_{ofs}$).

Figure 10:
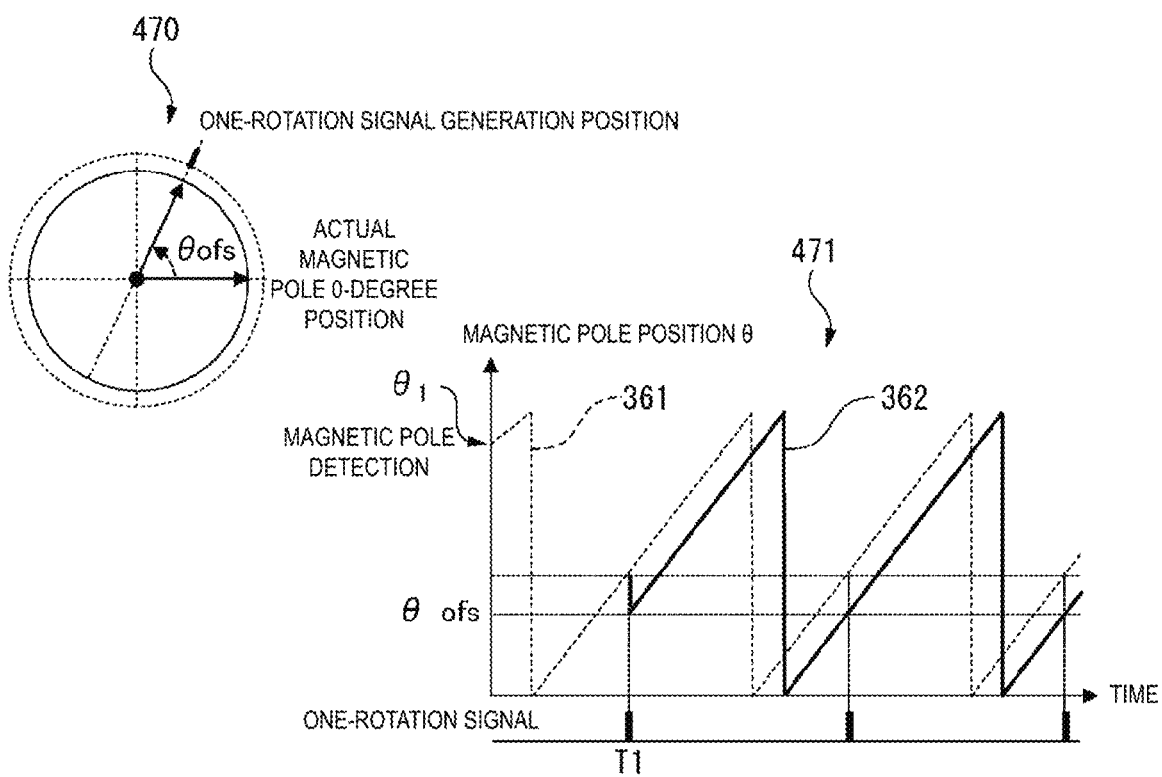
FIG. 10 is a diagram for describing a second example of an error correction operation.

FIG. 10 is a diagram for describing the error correction operation 2. A graph 470 illustrated on the left side in FIG. 10 represents a relationship between an actual magnetic pole position and a generation position of a one-rotation signal generated by the sensor 51. As illustrated in the graph 470, the sensor 51 generates the one-rotation signal with the predetermined magnetic pole offset ($\theta_{ofs}$) with respect to the position of the actual magnetic pole position of 0 degrees. The value of the magnetic pole offset ($\theta_{ofs}$) is previously stored in the error correction section 14.

A graph 471 on the right side in FIG. 10 is a graph representing a time transition of a magnetic pole position, in which a graph 361 shown in a broken line represents the time transition of the magnetic pole position with no correction processing. When there is no correction processing, the magnetic pole position starts the transition from a magnetic pole detection position $\theta_1$ at the completion time of the above-described magnetic pole position detection operation, and transits in the manner as depicted by the broken-line graph 361 in a state including an error. With the procedure B2 described above, the magnetic pole position at a time point T1, at which the one-rotation signal is generated, is corrected to $\theta_{ofs}$, and thus, thereafter the magnetic pole position transits in a state in which the error is corrected as depicted by a solid line 362.

FIG. 11 is a block diagram illustrating the motor control device 1000 including the magnetic pole position detection device 1 according to the embodiment of the present disclosure. The motor control device 1000 includes the magnetic pole position detection device 1, a speed control section 31, a current command generation section 32, the current control section 33, a dq-three-phase conversion section 34, the power conversion section 35, a three-phase dq-conversion section 36, and a speed acquisition section 37. The speed control section 31 generates a torque command $T_cmd$ on the basis of a speed command $\omega_{cmd}$ and a speed $\omega_m$ of the rotor of the synchronous motor 2 acquired by the speed acquisition section 37. The current command generation section 32 generates a d-axis current command $I_{dc}$ and a q-axis current command $I_{qc}$ on the basis of the torque command $T_{cmd}$ and the speed $\omega_m$ of the rotor of the synchronous motor 2 acquired by the speed acquisition section 37.

The three-phase dq-conversion section 36 performs three-phase dq conversion on three-phase currents $I_u$, $I_V$ and $I_W$ output from the power conversion section 35 on the basis of the magnetic pole position detected by the magnetic pole position detection device 1, and outputs a d-axis current $I_d$ and a q-axis current $I_q$ to the current control section 33. In normal motor control, the current control section 33 generates a d-axis voltage command $V_{dc}$ and a q-axis voltage command $V_{qc}$ on the basis of the d-axis current command $I_{dc}$, the q-axis current command $I_{qc}$, the d-axis current $I_d$, and the q-axis current $I_q$. At the time of the magnetic pole position detection operation, the current control section 33 generates the d-axis voltage command $V_{dc}$ and the q-axis voltage command $V_{qc}$ for flowing a constant excitation current, on the basis of the excitation command (e.g., $I_d=I_e$, $I_q=0$) output from the magnetic pole position detection device 1. The dq-three-phase conversion section 34 performs dq-three-phase conversion on the d-axis voltage command $V_{dc}$ and the q-axis voltage command $V_{qc}$ on the basis of the magnetic pole position detected by the magnetic pole position detection device 1, and outputs three-phase voltage commands $V_{uc}$, $V_{vc}$, and $V_{wc}$ to the power conversion section 35.

The power conversion section 35 is composed of, for example, an inverter (three-phase inverter) composed of a full-bridge circuit of a semiconductor switching element, and controls the on-off of the semiconductor switching element to output the three-phase currents $I_u$, $I_v$, and $I_w$ for driving the synchronous motor 2, on the basis of the received three-phase voltage commands $V_{uc}$, $V_{vc}$, and $V_{wc}$.

The excitation command generation section 11, the torque-zero determination section 12, the speed control section 31, the current command generation section 32, the current control section 33, the dq-three-phase conversion section 34, the three-phase dq-conversion section 36, the speed acquisition section 37, and a magnetic pole position update section 41 may be configured in the form of a software program, for example, or may be achieved by a hardware-based configuration such as various electronic circuits, application specific integrated circuits (ASICs) or the like. For example, in the case where the above-described sections are configured in the form of a software program, the functions of the sections may be enabled by causing the central processing unit (CPU) installed in the motor control device 1000 to operate in accordance with the software program.

With the magnetic pole position detection device according to the present embodiment configured to detect a magnetic pole position by performing excitation with a scheme in which the excitation phase is variable as described above, it is possible to shorten the time required to detect the magnetic pole position as compared to the case in which the magnetic pole initial value is detected by performing excitation with a fixed current phase.

Although the foregoing has described the present invention by using a representative embodiment, it will be clear to one skilled in the art that many variations, as well as other modifications, omissions, and additions, can be made on each of the above-described embodiments without departing from the scope of the present invention.

In the above-described magnetic pole position detection operation, the operation of determining the torque zero by detecting the time point at which the acceleration of the rotor becomes zero is performed, and the following operation may be performed in addition to the above-described operation to detect the torque zero. Here, it is assumed that the initial value of the excitation phase (initial excitation phase) and the initial position of the rotor (magnetic pole) at the start time point of the magnetic pole detection operation are separated not less than 90 degrees. When the torque generated on the rotor is described again, it may be represented by the following mathematical equation. In this case, for the sake of simplicity, a non-salient-pole synchronous motor is considered. It is assumed that the excitation phase is $\theta_e$. Note that $\theta$ is a position of the rotor.

$$\text{Torque} = \varphi_0 \cdot I_e \cdot \sin(\theta_e - \theta)$$

From the above torque equation, it is understood that the absolute value of the torque is maximum when $(\theta_e - \theta)$ is 90 degrees or −90 degrees. In other words, when the magnetic pole position detection operation is started from a position at which the position of the rotor is separated greater than or equal to 90 degrees from the initial value of the excitation phase, the maximum value is generated before the acceleration of the rotor reaches zero. Accordingly, it is possible to detect that the magnetic pole initial position is −90 degrees (when the acceleration of the rotor is positive) or +90 degrees (when the acceleration of the rotor is negative) by detecting the time point at which the acceleration of the rotor reaches the maximum value.

The graph 371 of the acceleration change of the rotor illustrated in the acceleration characteristics 70A of FIG. 7 represents the time transition of the acceleration when the initial position of the rotor is separated greater than or equal to 90 degrees in the negative direction with respect to the initial excitation phase at the start time of the magnetic pole position detection operation. In this case, the acceleration indicates its maximum value during the period from the time when the magnetic pole position detection operation starts to the time when the acceleration becomes zero. The time point at which the maximum value is generated is a time point at which the magnetic pole position is −90 degrees (when the initial excitation phase is 0 degrees).

Figure 12:
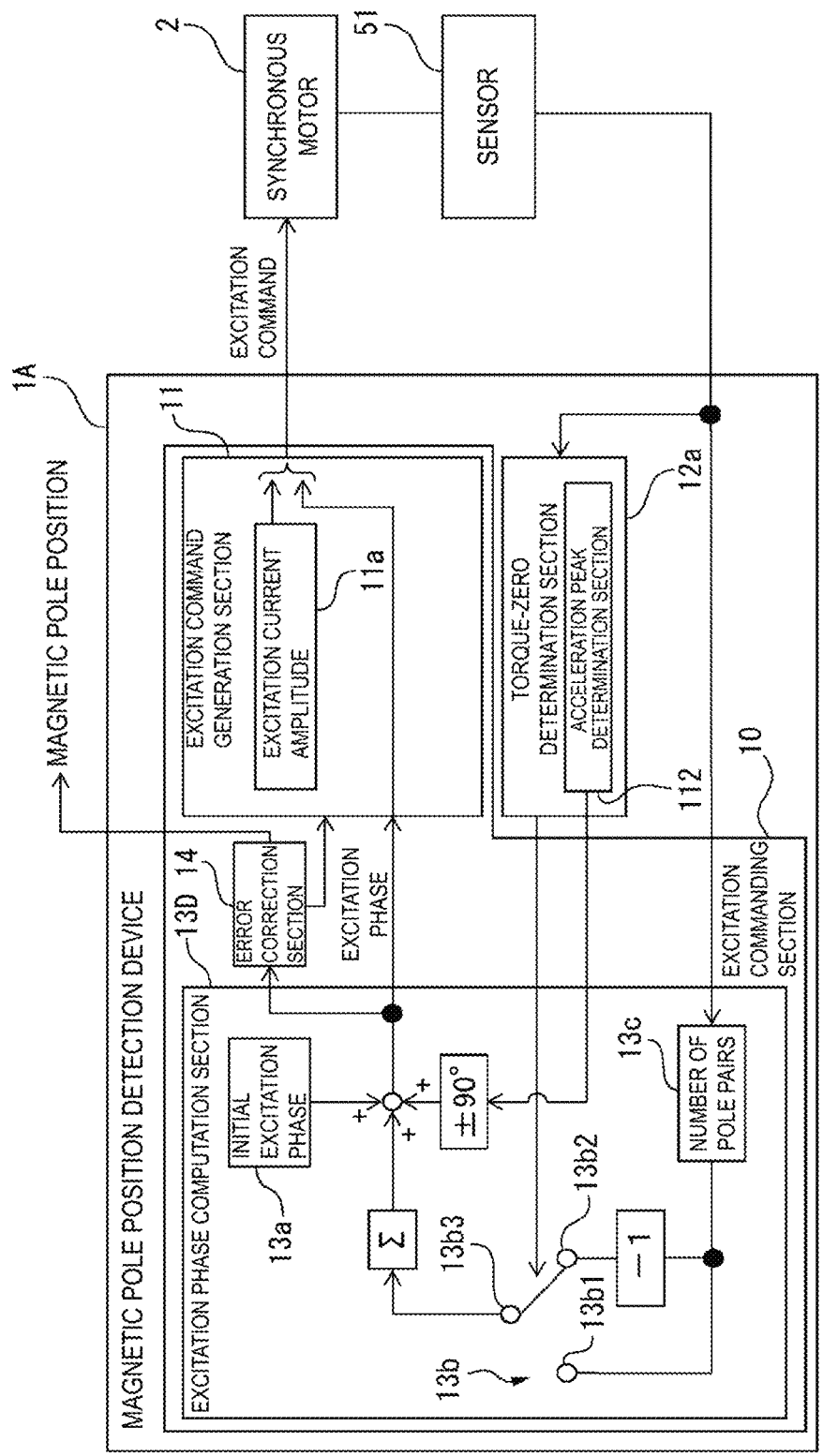
FIG. 12 is a block diagram illustrating another configuration example of a magnetic pole position detection device.

FIG. 12 illustrates a configuration of a magnetic pole position detection device 1A implementing the above-mentioned operation. In this case, an acceleration peak determination section 112 configured to detect the peak of the acceleration of the rotor while the excitation current is flowing through the synchronous motor 2 is added in a torque-zero determination section 12a. With this, the torque-zero determination section 12a is configured to switch the connection of the output end 13b3 of the switching section 13b to the input end 13b1 side even when the maximum value of the absolute value of the acceleration of the rotor is detected before the torque zero is detected. An excitation phase computation section 13D is configured to acquire, as the magnetic pole initial position, a value obtained by adding −90 degrees or +90 degrees to the initial excitation phase value, in accordance with the polarity of the acceleration of the rotor, at a time point at which the acceleration peak of the rotor is detected by the acceleration peak determination section 112.

The programs for executing various types of processing such as the magnetic pole position detection operation in the above-described embodiments may be recorded on various kinds of computer-readable recording media (e.g., a ROM, EEPROM, semiconductor memory such as a flash memory, magnetic recording medium, and optical disk such as a CD-ROM, DVD-ROM or the like).

REFERENCE SIGNS LIST 1, 1A Magnetic pole position detection device
2 Synchronous motor
10 Excitation commanding section
11 Excitation command generation section
12, 12a Torque-zero determination section
13, 13D Excitation phase computation section
13b Switching section
14 Error correction section
31 Speed control section
32 Current command generation section
33 Current control section
34 dq-three-phase conversion section
35 Power conversion section
36 Three-phase dq-conversion section
37 Speed acquisition section
51 Sensor
112 Acceleration peak determination section

The invention claimed is:

1. A magnetic pole position detection device configured to detect a magnetic pole position of a rotor of a synchronous motor, the device comprising:
an excitation commanding section configured to excite the synchronous motor while changing a current phase of an excitation current for exciting the synchronous motor from an initial value that is preset; and
a torque-zero determination section configured to determine whether torque generated on the rotor has become zero while the excitation current is flowing through the synchronous motor,
wherein the excitation commanding section, after having excited the synchronous motor with the initial value of the current phase, continuously performs an operation of exciting the synchronous motor in such a manner that a value obtained by subtraction processing for subtracting, from the initial value, a phase angle corresponding to a cumulative value of a movement amount of the rotor from a start time point of exciting the synchronous motor with the initial value of the current phase, is taken as the current phase of the excitation current until the torque-zero determination section determines that the torque has become zero, and
the excitation commanding section acquires the value obtained by the subtraction processing as a magnetic pole initial position at a time of the determination made by the torque-zero determination section that the torque has become zero.

2. The magnetic pole position detection device of claim 1, wherein after the torque-zero determination section determines that the torque has become zero, the excitation commanding section adds, to the magnetic pole initial position, the phase angle corresponding to the cumulative value of the movement amount of the rotor after the time of the determination that the torque has become zero to acquire a present value of the magnetic pole position.

3. The magnetic pole position detection device of claim 2, further comprising:
an error correction section configured to
stop the synchronous motor by commanding the synchronous motor to be at a speed of zero after completion of acquisition of the magnetic pole initial position,
excite the synchronous motor, after the synchronous motor stops, at a current phase being fixed at which the synchronous motor stops, and
take the fixed current phase, after a predetermined time has passed, as the present value of the magnetic pole position of the synchronous motor.

4. The magnetic pole position detection device of claim 2, further comprising:
an error correction section configured to
rotate the synchronous motor at a constant speed after completion of acquisition of the magnetic pole initial position, and
replace the present value of the magnetic pole position, at a time point of receiving a pulse signal output every time the synchronous motor makes one rotation from a sensor provided in the synchronous motor, with a predetermined value corresponding to a position of the rotor where the pulse signal is generated within the synchronous motor.

5. The magnetic pole position detection device of claim 1, further comprising:
an acceleration peak determination section configured to detect a peak of acceleration of the rotor while the excitation current is flowing through the synchronous motor,
wherein the excitation commanding section acquires, as the magnetic pole initial position, a value obtained by adding −90 degrees or +90 degrees to the initial value of the current phase in accordance with polarity of the acceleration of the rotor at a time point of detection of an acceleration peak of the rotor by the acceleration peak determination section.

* * * * *